Aug. 18, 1931.  P. W. HALL  1,819,092
SOIL TREATING MECHANISM
Filed March 10, 1931   3 Sheets-Sheet 2
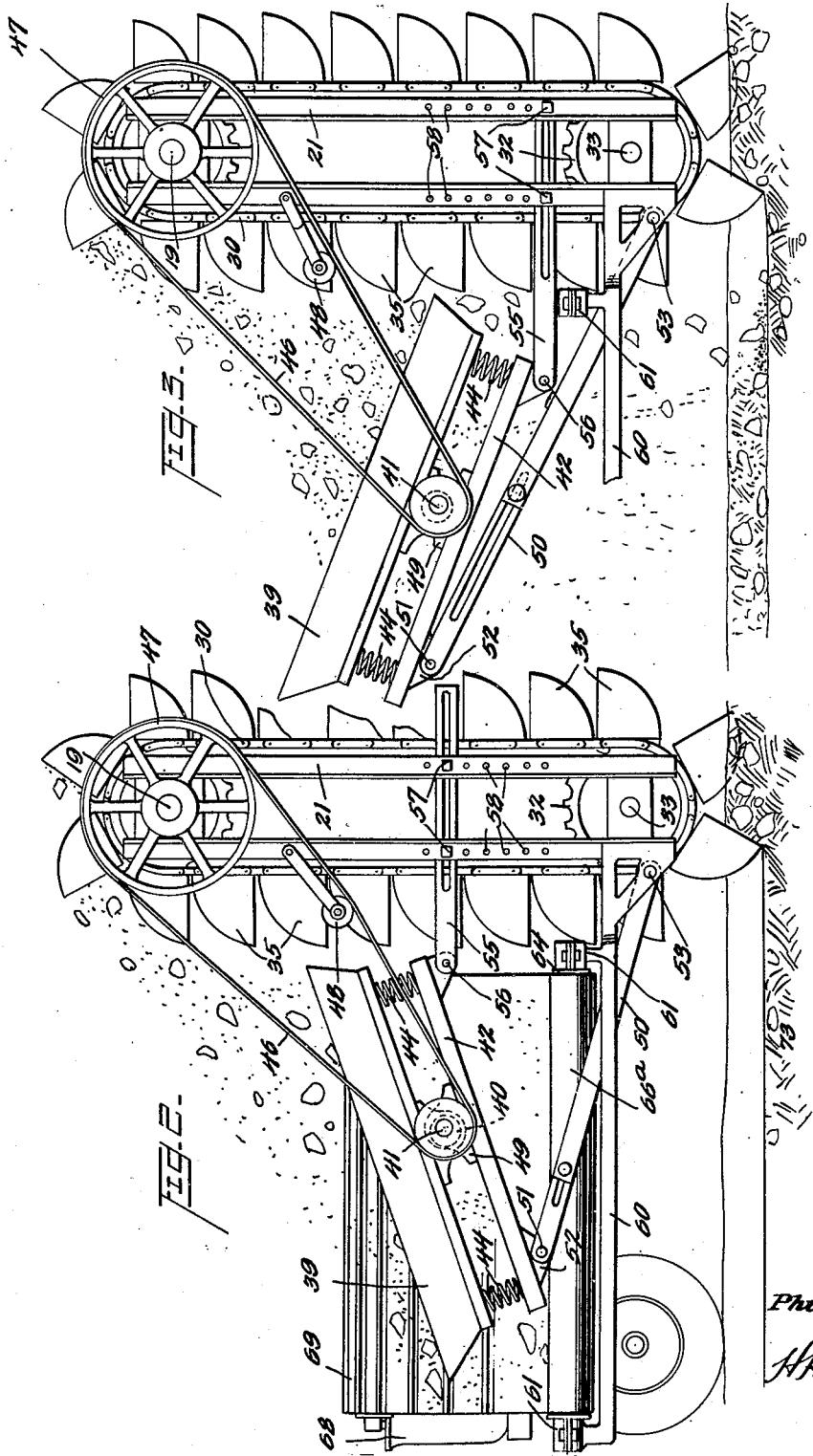

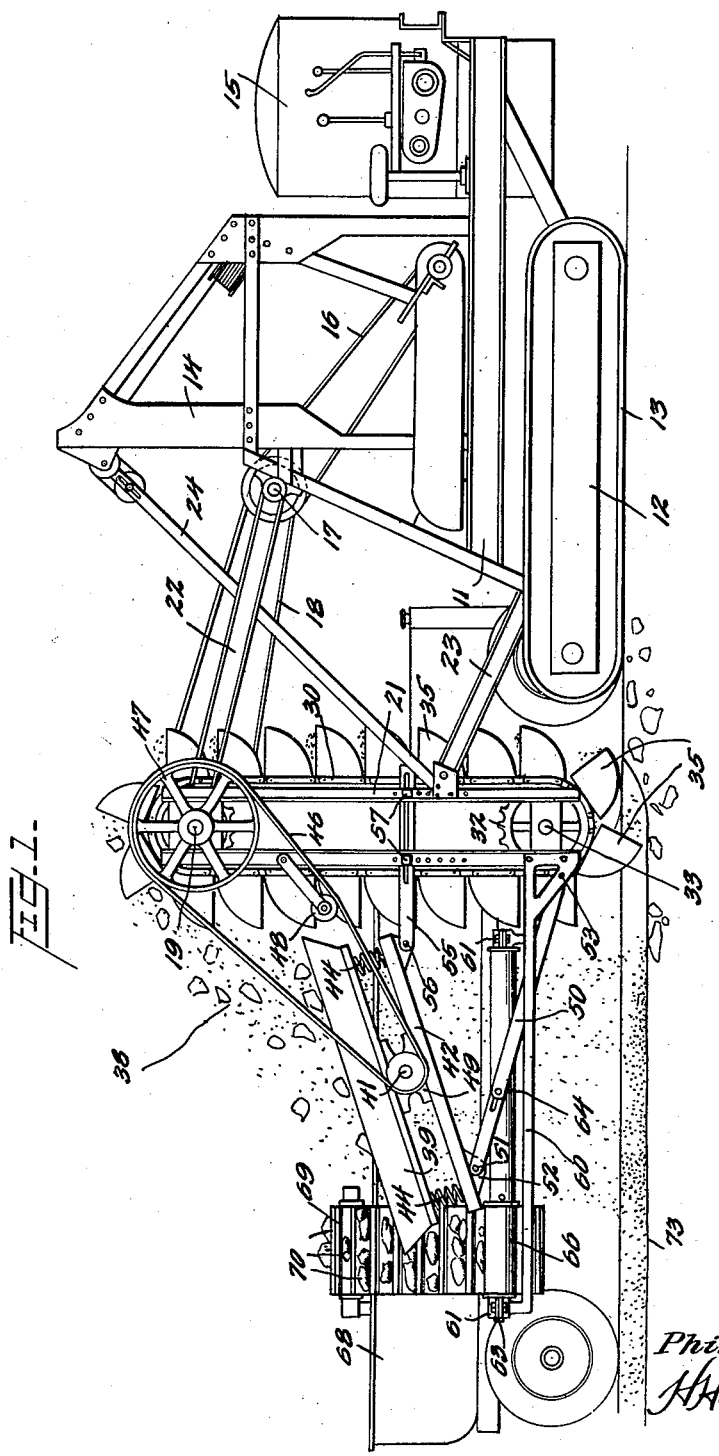

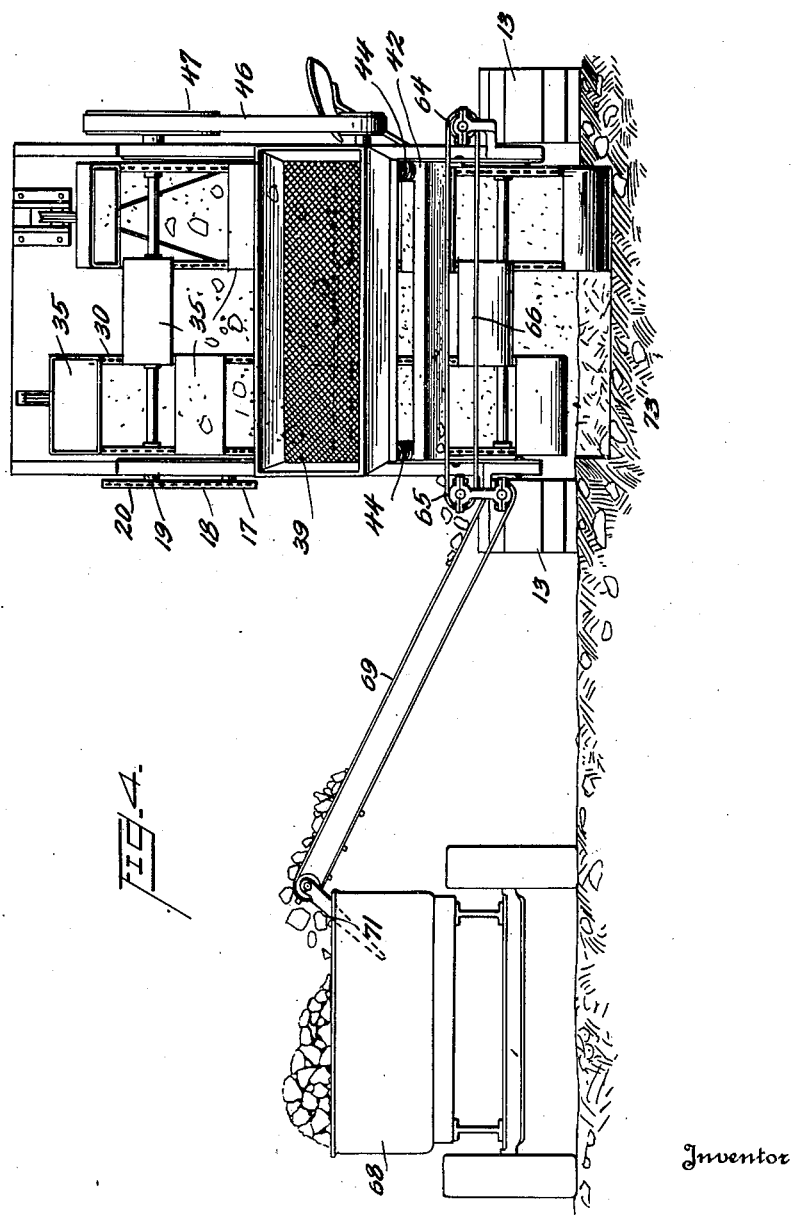

Patented Aug. 18, 1931

1,819,092

UNITED STATES PATENT OFFICE

PHILIP W. HALL, OF CRANFORD, NEW JERSEY

SOIL TREATING MECHANISM

Application filed March 10, 1931. Serial No. 521,588.

This invention relates to soil treating mechanism and has for its principal object the provision of a device which will remove the top soil, break it up, clear it of stones or growing matter such as cover crops and deposit the non-soil material under the soil or over the soil whichever may be desired or to remove some part of the material such as stones, for example, and which device may, under some circumstances, discharge the stones back upon the graded earth while removing the soil for use elsewhere.

A further object of the invention is the provision of a bucket plow capable of moving at a very fast rate over the ground, taking up the top soil with other material in it and delivering it to a shaking screen, the latter being so mounted as to tilt about a central transverse horizontal axis to discharge the material which does not pass thru the screen either on top of or below the screened material. A still further object of the invention is the provision of a bucket plow in which the buckets are mounted on their carrying means in échelon formation, this materially aiding in securing a much faster speed for the vehicle.

A still further and important object of the invention is the combination with a soil treating mechanism of a ground engaging carrier for such mechanism capable of quick turning action and arranged in such fashion that the weight of the soil treating mechanism at the rear is balanced by the motive power at the front so that the entire mechanism can be carried on a single pair of endless track devices which also receive their power from the weight balancing engine.

Farm problems could be much simplified if the entire handling of the ground be accomplished in a single trip and my device is designed for that purpose. In its preferred form I do plow the ground with a plurality of series of buckets, here shown as only three in number but which naturally can be increased for the wider machines which will be used on larger estates. The plow mechanism consists only of these buckets and they discharge the material in every case to a mechanism which is preferably a gyrating screen thru which the soil may pass.

Should the purpose of use of the machine in a particular instance be to prepare soil for sowing seed the fine particles which pass thru the screen will naturally be deposited directly on the face of the earth. Should the ground be stony I would tilt the shaking screen to throw the stones to the rear. In the simpler units the stones would fall on top of the soil and would later be removed in any desired manner but in the more complete units the stones would be delivered to a conveyor which is part of the mechanism and by it thrown to one side of the treated swath or preferably a cooperating truck independently driven could run parallel to my device and receive by suitable conveying means the stones which are carried to one side by the cross conveyor of the device and in this way I can remove all of the stones from the soil in a single operation.

Many times, however, there are no stones in the soil but a cover crop has been planted which the farmer desires to put into the soil to add to its fertility. In this case I merely tilt the screen in reverse direction, that is, have it discharge the material, which does not pass thru, in front of the soil which does pass thru and in this way I bury the cover crop under the aerated soil.

Now it may well be that the user is building a road. In this case he wishes to save the stones in situ and he also naturally wishes to keep the valuable top soil for use elsewhere. In such case the screen is shifted to discharge the stones to the rear and the cross conveyor is moved forwardly so as to discharge to the accompanying truck the top soil.

In all of the devices I much prefer that all of the mechanism except the accompanying truck and its own individual conveyor shall be balanced on a single pair of spaced tractor elements of the endless type, making the turning of the device very simple provided the weight is balanced about the endless track members as is the case here. I also prefer that the digger frame shall be vertically movable to regulate the chosen depth of cut which obviously will vary in the different localities and provision is therefore made so that the digger frame will be maintained in vertical position no matter what depth of the cut.

In the drawings:

Figure 1 is a side elevation of the device of my invention showing normal use, that is, the discharge of the plowed and sifted soil back in position on the earth and the discharge of the stones to the accompanying truck.

In Figure 2 the device is the same but the conveyor has been moved forwardly so as to transfer the soil to the accompanying truck while discharging the stones to the earth behind the vehicle.

In Figure 3 the cross conveyor is not in use and my device is shown as depositing the cover crop forwardly of the finely divided soil which latter will then cover the material which has not passed thru the screen.

Figure 4 is a rear elevation of the device as arranged in Figure 1.

Referring particularly to Figure 1 the main frame consists of an open, steel body or platform 11 mounted directly on a pair of tractors 12 each having an endless track 13 of any of the well known makes. From the platform rises a superstructure 14 following approved practice and forming per se no part whatsoever of my invention. At the extreme front of the platform 11 is an engine 15 which furnishes power for the entire plowing vehicle and this engine not only independently drives the two endless tractors but also thru chain 16 drives a transverse shaft 17 carrying a sprocket wheel which drives chain 18, the latter driving the upper or drive shaft 19 of the digger frame thru a sprocket wheel 20.

The digger frame 21 is supported on the main frame thru an upper link 22 and a lower link 23 each pivoted at their forward ends to the main frame and pivoted at their rear ends to the digger frame which therefore remains substantially vertical as it is raised and lowered thru the cables 24 in well known manner. About the digger frame revolve a plurality of endless chains 30 driven from sprockets fast to shaft 19 and traveling over idler wheels 32 on the lower or idle shaft 33 of the digger frame.

Between the chains 30, here shown as four in number, are mounted a series of digger buckets 35 preferably arranged in échelon as in this way only a single bucket comes in contact with the ground to be plowed at one time, thus distributing the load on engine 15 in a manner to increase the life of the vehicle and also to increase quite materially the smoothness of action.

The buckets themselves are of well known type and throw the material dug as at 38 to a screen 39 which may be of any type but which I much prefer to gyrate or shake which movement I secure by mounting the screen on eccentrics 40 on shaft 41 carried by the screen frame 42 and from which the screen is supported at its four corners by springs 44. The shaft 41 is revolved in chosen manner, preferably by the belt 46 driven from a large pulley 47 at the near side of the shaft 19, the pulley wheel 47 being of such size as to cause a very rapid revolution of the eccentric carrying shaft 41. The idle pulley 48 is movable so as to keep the belt taut while permitting material changes in the relative distance between the eccentric shaft 41 which is mounted in journals 49 on the screen frame 42 and the main digger frame shaft 19.

In order to shift the position of the screen 39, which is quite an important feature of the invention, I join the screen frame 42 to the digger frame by means of a link 50 pivoted at its rear end as at 51 to a dependent lug 52 extending downwardly from the screen frame 42 and this link 50 is pivoted at its forward end as at 53 to one of the vertical beams of the digger frame 21. Above the link 50 is a second supporting link 55, the latter pivoted directly to a lug on the screen frame 42 as at 56 and connected to the digger frame 21 by readily adjustable bolts 57, the link 55 being slotted so as to have fore and aft movement and the bolts 57 being adapted to be received in chosen holes or openings 58 in the vertical beams of the digger frame. By virtue of this arrangement of parts I can tilt the screen to discharge rearwardly as is the case in Figures 1 and 2 or to discharge forwardly as in Figure 3.

Extending rearwardly from the digger frame are a plurality of horizontal bars 60 from which rise bearings 61 for the square shaft 63 on which the roller 64 may slide in a fore and aft direction while revolving with the shaft. On this driven roller 64 and on a companion idle roller 65 at the other side of the vehicle is mounted a cross conveyor belt 66 the arrangement of parts enabling the cross conveyor to be shifted to the extreme rear as in Figure 1, to an intermediate position as in Figure 2, or to a forward position, not shown, such as might under rare cases be desired when the screen is in the position shown in Figure 3.

Referring particularly to Figure 4 my vehicle is intended for use with a truck 68 of the usual type from which may be supported an auxiliary conveyor 69 which receives the stones 70 from the cross conveyor 66 and discharges them thru a chute 71 into the waiting truck. It is quite obvious that instead of the stones 70 the auxiliary conveyor can, as in Figure 2, receive the soil itself while discharging the stones 70 to the graded earth surface 73.

In Figure 2 the cross conveyor belt 66ª, which is considerably wider than the belt 66, is mounted on the roller 64 and catches most, if not all, of the soil which passes thru the screen 39, the latter being in the same position as in Figure 1. In this case, as before, the stones are thrown to the rear but instead of being received on the belt 69 are discharged directly to the graded surface 73 which is to form a walk or road and it is the soil only which is carted away in the truck 68.

In Figure 3 the link or bar 55 has been lowered so that now the screen 39 is tilting downwardly and forwardly in order to discharge the material which does not pass thru the screen to the graded surface 73 in front of the soil which passes thru the screen and the latter therefore covers the material which does not pass thru. Under these circumstances the truck 68 and its conveyor 69 are not used.

What I claim is:

1. In a soil treating machine, a track-laying tractor, a main frame supported thereby, a digger frame movably carried by the main frame, means for moving the digger frame vertically, a plurality of digging buckets mounted to revolve about the digger frame, means for separating the soil from other material such as stones, means for driving the tractor and the digger buckets, and means for adjusting the soil separating means so as to discharge the soil either above or below said other material as may be desired.

2. The device of claim 1 plus a cross conveyor shiftable toward and away from the main frame to receive selectively from the soil separating means either the soil or the other material such as stones so that either at will may be returned to the earth while the other may be discharged to one side or be carried away.

3. The device of claim 1 in which the soil separating means is a vibratory screen receiving power from the driving means.

4. The device of claim 1 in which the soil separating means is a vibratory screen tiltable about a transverse horizontal axis so that it may shift the stones either forwardly of the screen or rearwardly thereof as may be desired.

5. The device of claim 1 in which the digger buckets are mounted on the digger frame in échelon formation.

6. The device of claim 1 in which the soil separating means is a screen, one end of which is connected to the digger frame by a link pivoted to the frame and to the screen and the other end of the screen is connected to the digger frame by a link which is vertically adjustable on the digger frame so as to tilt the screen in desired direction.

In testimony whereof I affix my signature.

PHILIP W. HALL.